No. 758,311.

Patented April 26, 1904.

UNITED STATES PATENT OFFICE.

GUSTAV GOLDMAN, OF BALTIMORE, MARYLAND.

METHOD OF FELTING OR MATTING FIBERS TOGETHER.

SPECIFICATION forming part of Letters Patent No. 758,311, dated April 26, 1904.

Application filed August 29, 1903. Serial No. 171,287. (No specimens.)

*To all whom it may concern:*

Be it known that I, GUSTAV GOLDMAN, of Baltimore, Maryland, have invented a new and useful Method of Felting or Matting Fibers Together, which method is fully set forth in the following specification.

In an application executed of even date herewith I have broadly described and claimed a process of binding masses of fibrous material together by the introduction between the fibers of a suitable binding material in a finely-divided dry condition and subsequently treating said materials so as to cause them to actively bind the fibers into a felted mass, and in said application I have also specifically claimed the introduction among the fibers of a hygroscopic substance, together with a suitable material whereby moisture will be imparted to the binding material and it will be rendered capable of actively binding the fibers together.

The object of the present application is to protect another specific form of the invention, which is referred to in said previous application, but not specifically claimed therein.

The present invention consists in introducing between the fibers, which may be of animal, vegetable, or mineral origin, or a mixture of these, a finely-divided dry binding material, together with substances containing water of crystallization, which by subsequent treatment, as by the application of heat, is afterward freed and acts upon the dry binding material to convert it into an active binder. The binding material may be in the form of finely-divided glue, gelatin, dextrine, flour, or other material which is not an active binder in its dry finely-divided condition, but which upon being treated with moisture will be caused to adhere to the fibers and actively bind them together. The substance containing water of crystallization may be an efflorescent substance, such as crystalline sodium carbonate, (sal-soda,) or substances, such as alum, which are not efflorescent, but which, nevertheless, contain water of crystallization and which by subsequent treatment, as by heat or otherwise, may be caused to part with their water of crystallization, thus providing the moisture necessary to convert the dry inactive binder into an active binding condition.

One method, which has been found to give very satisfactory results, is as follows: The fiber to be treated—say cotton, for example—is disposed in a suitable film by the carding machinery, and appropriate binding material—for instance, flour or starch and crystalline soda—is dusted between the fibers, preferably as they come from the carding-machine, or between successive superimposed films of the fibers. The fibrous material is then subjected to heat and pressure, preferably in the presence of steam, and for mechanical convenience, continuity of operation, and economy of production the mass of fibers, in which the proper binding material has been introduced as before indicated, is carried between heated rollers. The result of this treatment is to render the flour or starch by the addition of the water of crystallization from the soda capable of binding the cotton into a felted mass. Other binding substances than flour or starch may be used with equally satisfactory results and other substances containing water of crystallization may be substituted for the crystal soda without departing from the spirit of the invention.

While the steam which it is preferred to employ may be formed exterior to the mass of the fibers and subsequently introduced thereinto, it may also be formed by introducing moisture among the fibers in any suitable way and subsequently converting said moisture into steam by the application of heat. Moreover, the application of heat to the substances containing water of crystallization would not only set free such water of crystallization, but if the temperature is carried above 212° Fahrenheit would also act to convert the water of crystallization thus set free into steam. Any and all of these or other modes of introducing steam among the fibers in the instances in which its presence is desirable or advantageous would fall within the spirit of this invention.

The condition herein described as a "dry" condition is meant to include any and all conditions of the binding material or materials which will permit it or them to be introduced between the fibers in a finely-divided state, preferably as a powder or similar state of fine divison. While the powdered form of the binder is preferred in order that it may sift in between the fibers, this is not essential, as the binder may be, if desired, and in some instances is finely divided into infinitesimally thin sheets or into minute threads, which are introduced between films or layers of the fibers or otherwise.

From the foregoing description it will be evident that for the purposes of this invention it is not essential that the binding material should actually sift through the entire mass of the fibers under treatment. It is equally within the invention if the binding material be applied to those fibers lying near the exterior surface or surfaces of the mass of fibers under treatment or if the binding material operates upon successive superimposed films or sheets so as to bind the fibers togethers into a combined felted mass.

Having thus described the invention, what is claimed is—

1. The method of binding fibers together, which consists in introducing between the fibers a dry finely-divided binding material, together with a substance containing water of crystallization, and then treating the same so as to cause the substance to part with its water of crystallization, whereby the binding material is rendered capable of actively binding the fibers together.

2. The method of treating fibers or fibrous material, which consists in introducing between the fibers a dry finely-divided binding material together with a substance containing water of crystallization, and subjecting said substances to heat, whereby the water of crystallization is set free and the binding material is rendered capable of actively binding the fibers together.

3. The method of treating fibers or fibrous material, which consists in introducing between the fibers a dry finely-divided binding material together with a substance containing water of crystallization, and then subjecting said fibers to heat and pressure, whereby the water of crystallization is set free and the binding material is rendered capable of actively binding the fibers together.

4. The method of treating fibers or fibrous material, which consists in introducing between the fibers a dry finely-divided binding material together with an efflorescent substance, and treating said efflorescent substance so as to cause it to part with its water of crystallization, whereby the binding material will be rendered capable of actively binding the fibers together.

5. The method of treating fibers or fibrous material, which consists in introducing between the fibers a dry finely-divided binding material together with an efflorescent substance, and then subjecting said efflorescent substance to heat, whereby it is caused to part with its water of crystallization and thereby rendering the binding material capable of actively binding the fibers together.

6. The method of treating fibers or fibrous material, which consists in introducing between the fibers a dry finely-divided binding material together with an efflorescent substance, and subsequently treating said efflorescent substance with steam, whereby it is caused to part with its water of crystallization thereby rendering the binding material capable of actively binding the fibers together, and then subjecting the fibers to heat and pressure.

7. The method of treating fibers or fibrous material, which consists in introducing between the fibers a dry finely-divided binding material together with crystalline sodium carbonate, and then treating the latter so as to cause it to part with its water of crystallization and thereby render the binding material capable of actively binding the fibers together.

8. The method of treating fibers or fibrous material, which consists in introducing between the fibers a dry finely-divided binding material together with crystalline sodium carbonate, and subsequently subjecting said sodium carbonate to the action of heat, whereby it is caused to part with its water of crystallization and render the binding material capable of actively binding the fibers together.

9. The method of treating fibers or fibrous material, which consists in introducing between the fibers a dry finely-divided binding material together with crystalline sodium carbonate, and subsequently treating the same with steam thereby rendering the binding material capable of actively binding the fibers together, and then subjecting the mass of fibers to heat and pressure.

10. The method of treating fibers or fibrous material, which consists in introducing between the fibers a dry finely-divided binding material together with a substance containing water of crystallization, and then subjecting the mass to heat and pressure in the presence of steam, thereby rendering the binding material capable of actively binding the fibers together.

11. The method of treating fibers or fibrous material, which consists in introducing between the fibers a dry finely-divided binding material together with crystalline sodium carbonate, and then subjecting the fibrous mass to heat and pressure in the presence of steam, thereby rendering the binding material capable of actively binding the fibers together.

12. The method of treating fibers or fibrous material, which consists in introducing between the fibers dry finely-divided flour together with a substance containing water of crystallization, and then causing the latter to part with its water of crystallization, whereby the flour is rendered capable of actively binding the fibers together.

13. The method of treating fibers or fibrous material, which consists in introducing between the fibers flour together with a substance containing water of crystallization, and then subjecting the fibrous mass to heat and pressure, whereby the water of crystallization is set free and the flour is rendered capable of actively binding the fibers together.

14. The method of treating fibers or fibrous material which consists in introducing between the fibers flour together with a substance containing water of crystallization, and then subjecting the fibrous mass to heat and pressure in the presence of steam, whereby the flour is rendered capable of actively binding the fibers together.

15. The method of treating fibers or fibrous material, which consists in introducing between the fibers flour in a dry state together with an efflorescent substance, and then subjecting the fibers to heat and pressure, whereby the efflorescent substance is caused to part with its water of crystallization, thereby rendering the flour capable of actively binding the fibers together.

16. The method of treating fibers or fibrous material, which consists in introducing between the fibers dry flour and crystalline sodium carbonate, and then treating the latter so as to cause it to part with its water of crystallization, thereby rendering the flour capable of actively binding the fibers together.

17. The method of treating fibers or fibrous material, which consists in introducing between the fibers dry flour and crystalline sodium carbonate, and then subjecting the mass of fibers to heat and pressure, whereby the crystalline sodium carbonate is caused to part with its water of crystallization and thereby render the flour capable of actively binding the fibers together.

18. The method of treating fibers or fibrous material, which consists in introducing dry flour between the fibers together with crystalline sodium carbonate, and then subjecting the latter to heat, whereby it is caused to part with its water of crystallization, and thereby rendering the flour capable of actively binding the fibers together.

19. The method of treating fibers or fibrous material, which consists in introducing between the fibers dry flour and crystalline sodium carbonate, and then subjecting the mass of fibers to heat and pressure in the presence of steam, whereby the flour is rendered capable of actively binding the fibers together.

In testimony whereof I have signed this specification in the presence of two subscribing witnesses.

GUSTAV GOLDMAN.

Witnesses:
ARTHUR LEE BROWNE,
FRANCIS T. HOMER.